United States Patent Office 3,527,868
Patented Sept. 8, 1970

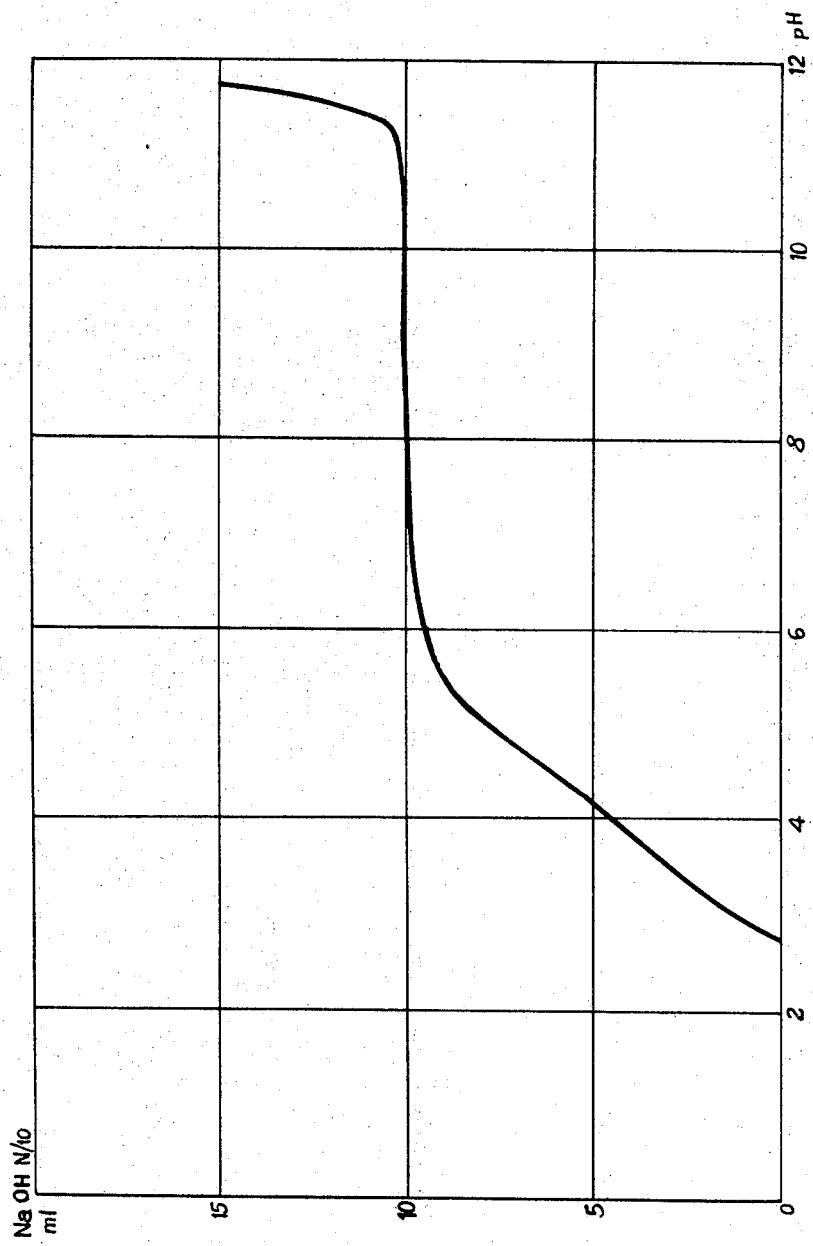

3,527,868
LIPOTROPIC MEDICINE HAVING AS A BASE BETAINE ACETYL ASPARTATE AND METHOD FOR TREATMENT THEREWITH
Yvonne Thuillier, Paris, France, assignor to Albert Rolland S.A., Paris, France, a French societe anonyme
Application Oct. 17, 1967, Ser. No. 678,480, now Patent No. 3,470,242, dated Sept. 30, 1969, which is a continuation-in-part of application Ser. No. 432,717, Feb. 15, 1965. Divided and this application June 9, 1969, Ser. No. 831,507
Claims priority, application France, Feb. 25, 1964, 965,070
Int. Cl. A61k 27/00
U.S. Cl. 424—316
2 Claims

ABSTRACT OF THE DISCLOSURE

A medicinal composition comprising as the active ingredient a major amount of betaine acetyl aspartate and a pharmaceutically acceptable carrier is administered to mammals for the treatment of hepatic steatosis in a daily dosage range about 100 to 2,000 milligrams of aspartate per kilogram of body weight.

---

This application is a division of my copending application, Ser. No. 678,480, filed Oct. 17, 1967, now Pat. No. 3,470,242 issued Sept. 30, 1969, which in turn is a continuation-in-part of my copending application, Ser. No. 432,717, filed Feb. 15, 1965 now abandoned.

My invention has for its object the provision of a novel medicinal composition comprising as the active ingredient a major amount of betaine acetyl aspartate and a pharmaceutically acceptable carrier, as well as a method for treating hepatic steatosis in mammals, comprising administering to a mammal betaine acetyl aspartate in a daily dosage range about 100 to 2,000 mg./kg. Betaine acetyl aspartate is a salt of betaine which is a weak base, and of acetyl aspartic acid, which is a diacid in which the amine function is saturated by acetic acid, each of the two functional groups of acetyl aspartic acid being saturated by the basic functional group of betaine. The invention has utility in the treatment of hepatic steatosis in mammals such as mice, rats, guinea pigs, rabbits, and the like.

The developed formula of said salt is as follows:

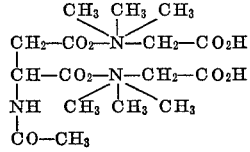

Its rough formula is $C_{16}H_{31}N_3O_9$, its molecular weight is equal to 409, and its centesimal composition is as follows:

|   | Percent |
|---|---|
| C | 46.94 |
| H | 7.58 |
| N | 10.27 |
| O | 35.21 |

Betaine acetyl aspartate which forms the object of the present invention is obtained by preparing first acetyl aspartic acid through reaction between acetic anhydride and aspartic acid dissolved in water, at a temperature ranging between 40 and 50° C.

The mixture is stirred during six hours at a maximum temperautre of 20° C. and distilled in vacuo so as to carry along the major part of the acetic acid, of the acetic anhydride and of the water, after which the acetyl aspartic acid formed is freed of the aspartic acid which has not reacted by treating said mixture with acetone.

This being done, betaine is caused to react with said acetyl aspartic acid in a methanol-carrying medium in which betaine is comparatively soluble. After heating to a slight extent and stirring, the mixture is distilled in vacuo so as to drive out the methanol, and the residuum is kiln dried in vacuo at a temperature ranging between 40 and 50° C. during 24 hours.

The substance obtained appears as a whitish water-soluble syrupy product. The pH of the solution at a concentration of 0.05 M is equal to 2.80. The total nitrogen contents measured through the Kjeldahl method are equal to 10.2%, which corresponds to the above centesimal formula. The aminated nitrogen being neutralized by the acetyl group, such a measurement does not show out any free aminated nitrogen and, in particular, there is no reaction with ninhydrine.

The electrometric titration of betaine acetyl aspartic acetate as a solution at a concentration of 0.05 M, of which the illustrative curve is shown in the single figure of the accompanying drawing, shows two free acid functional groups corresponding to the above formula.

Pharmacological investigation of the product when tested on rats has shown a lipotropic action. Said investigation has been executed in accordance with the following experimental program:

(1) A series of witness aminals has been subjected to a hyperlipidic diet, which supplies an excess of calories while it has no sufficient betaine contents, with a view to producing a steatosis of the liver.

(2) A series of animals has been subjected to the same diet and furthermore three times weekly to a subcutaneous injection of 10 mg. of betaine acetyl aspartate. Said series of animals has been sacrificed after one month with a preliminary sacrifice of three animals, one per week, followed by a histological examination.

(3) A third series of animals has been subjetced to the same diet together with a subcutaneous injection of the same volume of solvent, to wit 1 ml. The aminals have been sacrificed after one month and formed the object of a histological examination.

(4) A fourth series has been subjected to the same diet and after the same period has been subjetced to subcutaneous injections of 10 mg. of betaine acetyl aspartate, after which animals have been sacrificed at intervals with a view to examining them from a histological standpoint.

A preventive action has been found with No. 2 series and a curing effect has been found with No. 4 series when compared with the witness animals which have all shown large fatty infiltrations.

Toxicity tests have led to the conclusion of a complete absense of any acute or chronical toxicity.

The tests have been executed in succession on various types of animals: mice, Wistar rats, guinea pigs and rabbits. Through an intraperitoneal injection of increasing amounts equal to 100, 300, 500 and 1000 mg./kg., no mortality appeared. The product injected through intravenous injections, even at a rate of 300 mg./kg. in 5 ml. of solvent, has been well tolerated.

Tests of chronical toxicity have been executed on Wistar rats, each series of animals receiving daily 100 mg./kg. of a solution of betaine acetyl aspartate. Said amounts have been perfectly tolerated and have produced no lesion on the treated animals.

Betaine acetyl aspartate forms an interesting therapeutic medicine by reason of its lipotropic action. It associates in fact the chemical properties of aspartic acid with those of a donor of methyl groups by reason of the presence of betaine and of a donor of acetyl groups.

Now acetyl groups may be fixed in particular on the coenzyme A so as to produce the acetyl CoA which is an important metabolic intermediate which is necessary for the biosynthesis of fatty acids (reversibility of the β oxidation according to the Knoop method) and of sterols (chloesterol and steroid hormones) and chiefly it forms, through a fixation of acetyl on the oxaloacetic acid, a first stage in the Krebs cycle. The acetyl coenzyme A forms in fact a connection for the metabolism of glucides and lipides and it allows storing the energy required for the cells. On the other hand, aspartic acid is necessary for the biosynthesis of purine and pyrimidine. Consequently betaine acetyl aspartate plays an important part in the metabolism of glucides, lipides and mucleic acids. It protects hepatic cells against fatty intoxication and uniformizes the metabolism of lipides and glucides.

The improved medicine disclosed may be ingested in any usual manner: as pills, granulated products, a syrup, a solution whether to be drunk or to be injected, suppositories, the daily amounts ranging between 100 mg./kg. and 2 g./kg. of betaine acetyl aspartate, for example, as an encapsulated dosage form, 0.250 g. betaine acetyl aspartate and 0.750 g. mannitol as an excipient.

In various medical formulae betaine acetyl aspartate may form the sole active component or else it may be associated with other active components.

Having described my invention, I claim:

1. A medicinal composition for treating hepatic steatosis comprising as the active ingredient a major amount of betaine acetyl aspartate and a pharmaceutically acceptable carrier.

2. A method for treating hapatic steatosis in mammals, comprising administering to a mammal in need of such treatent betaine acetyl aspartate in a daily dosage range about 100 to 2,000 mg./kg.

References Cited

FOREIGN PATENTS 1,356,945  2/1964  France.

ALBERT T. MEYERS, Primary Examiner

J. D. GOLDBERG, Assistant Examiner